Sept. 12, 1967        S SPECTOR        3,341,215

TANK FOR STORING CRYOGENIC FLUIDS AND THE LIKE

Filed Nov. 25, 1966        5 Sheets-Sheet 1

INVENTOR.
SAM SPECTOR
BY
ATTORNEYS

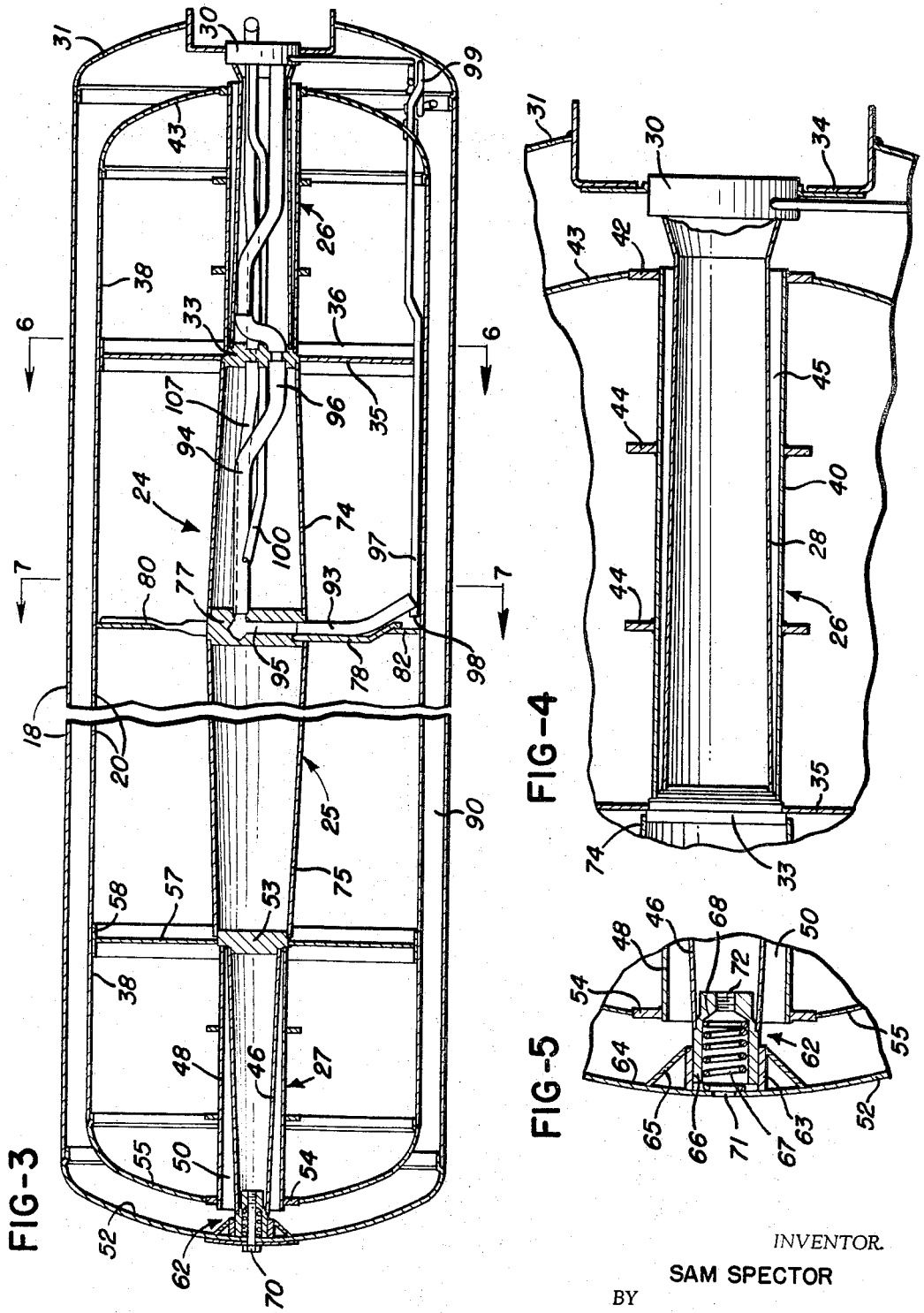

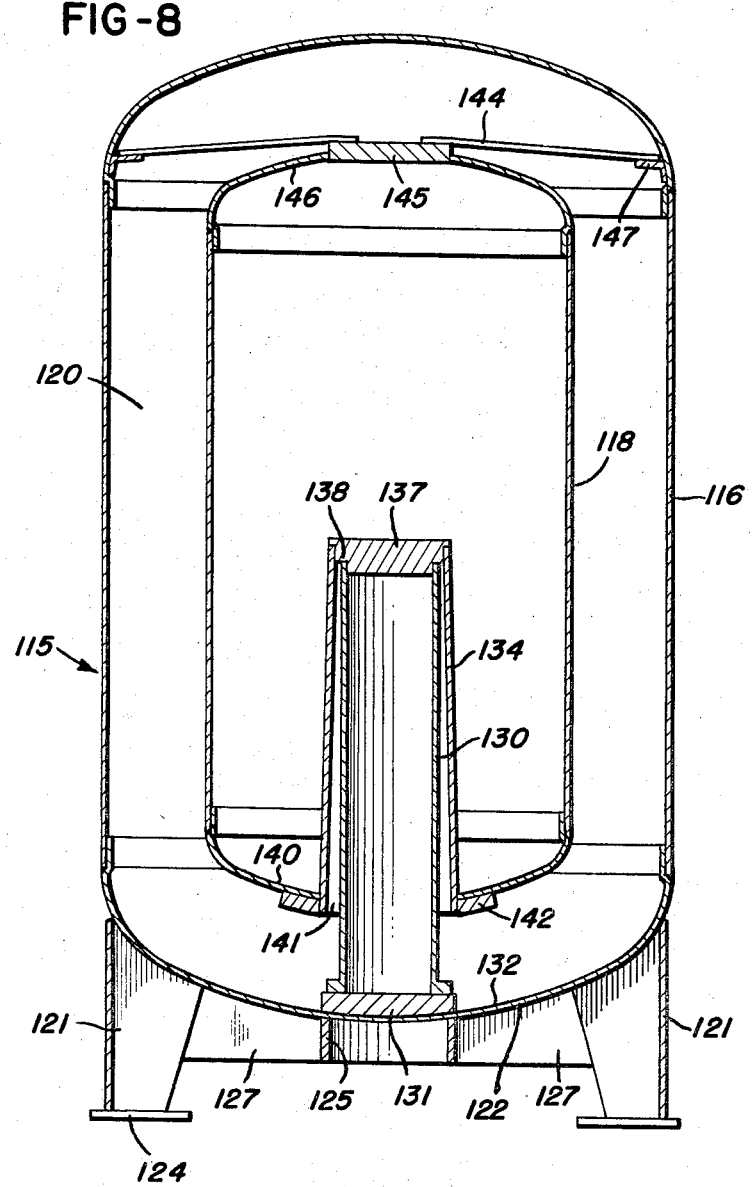

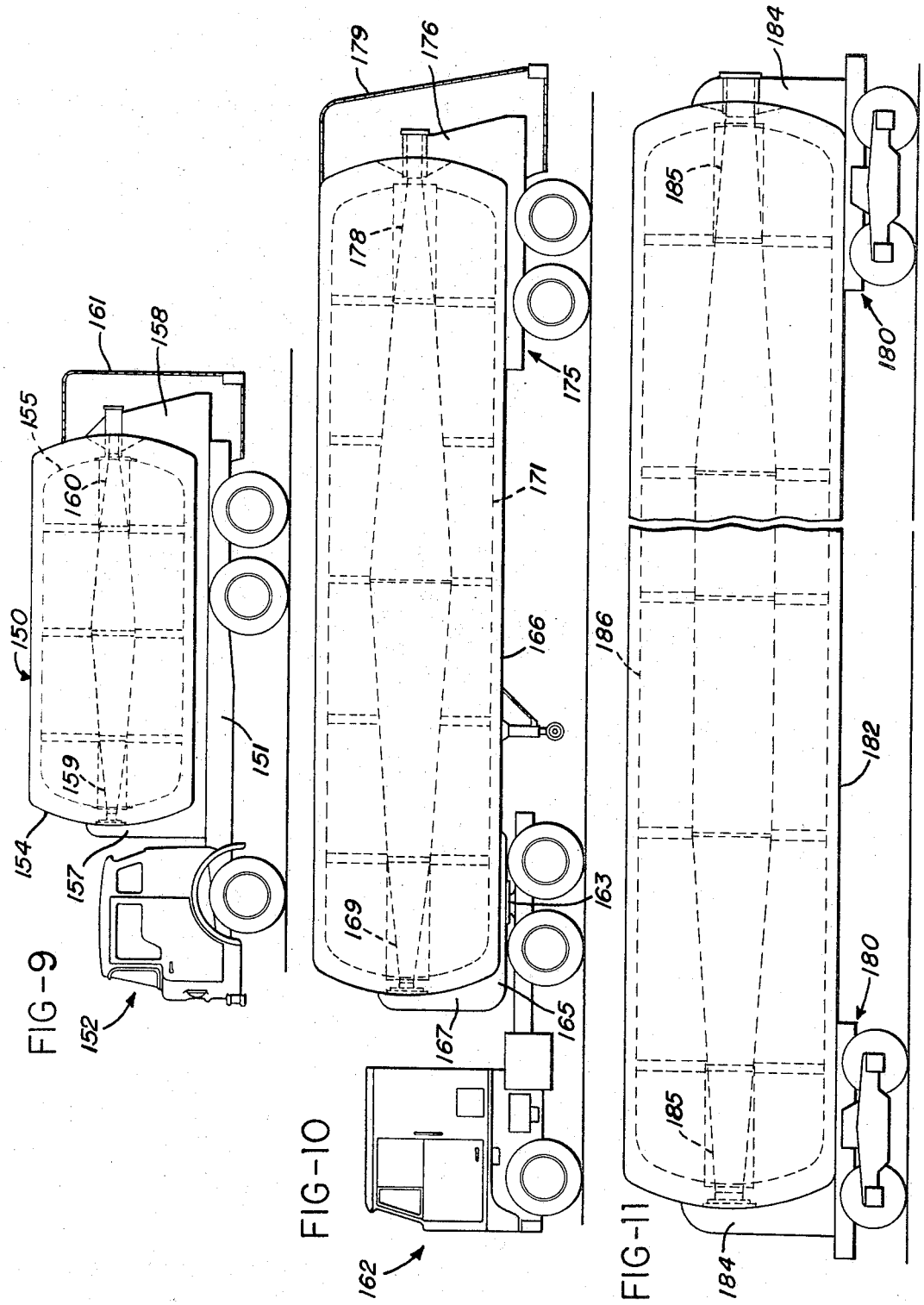

United States Patent Office 3,341,215
Patented Sept. 12, 1967

3,341,215
TANK FOR STORING CRYOGENIC FLUIDS AND THE LIKE
Sam Spector, Cleveland, Ohio, assignor to National Cryogenics Corporation, Holyoke, Mass., a corporation of Massachusetts
Filed Nov. 25, 1966, Ser. No. 604,103
17 Claims. (Cl. 280—5)

This invention relates to tank structure for handling fluids, and particularly to an insulated tank structure for storing cryogenic fluids.

This application is a continuation-in-part application of copending application Serial No. 360,326, filed Apr. 16, 1964, now abandoned.

The use of liquid nitrogen has come into wide commercial use as a cooling media for refrigeration transportation vehicles, such as trucks and rail cars for shipping fresh meats and dairy products. In these systems the nitrogen is periodically sprayed into the interior of vehicles so that heat is absorbed as the nitrogen liquid vaporizes for effectively reducing the temperature therein. The liquid nitrogen which vaporizes at —320° F. is stored in an insulated tank on the exterior of the vehicle, and the tank is pressurized by removing a small portion of the liquid from the tank, vaporizing it and then returning this pressurized gas to the tank.

However, in most tanks which employs an inner tank within an outer tank, there is a substantial heat leakage into the inner tank, primarily through the support structure which holds the inner tank in position in the outer tank. The heat flow causes additional vaporization of the liquid which adds to the pressurization of the inner tank. Since weight considerations limit the thickness of the tanks, a pressure relief valve must be provided for venting the nitrogen gas to the atmosphere when a predetermined maximum pressure is reached that, if exceeded, would cause failure of the tank. As a result, it is possible to discharge as high as to 25% or more of the nitrogen to the atmosphere during a long trip on a hot day.

In addition, the support apparatus for the inner tank must be very strong so that the dynamic stresses and loads encountered during a typical cross-country trip, in a semi-trailer truck, for example, will not damage the tank structure. It is desirable to minimize this support apparatus to limit heat transfer by conduction into the inner tank. Moreover, it is desirable that the inner tank haxe maximum capacity for the size of the outer tank and that the side walls of the inner tank be free of projections so that insulation can be easily wrapped thereon.

Accordingly, it is an important object of this invention to provide improved tank structure for storing a cryogenic fluid and which greatly minimizes heat transfer to the fluid therein and which provides high strength and rigidity for withstanding complex dynamic loading.

Another object of this invention is to provide a tank assembly for storing a cryogenic fluid and which includes an outer tank having an inner tank supported therein with a vacuum and minimum support structure therebetween, and particularly to provide a tank assembly of the aforesaid type which is capable of being constructed in a wide variety of sizes, as for example, from a tank holding only a few gallons to a tank capable of holding thousands of gallons and in the form of a tank vehicle.

A further object of this invention is to provide tank structure of the aforesaid type which is light in weight and capable of being economically manufactured, and further to provide such a tank structure which is capable of compensating for relative expansion between the inner and outer tank caused by temperature differential in a simple and dependable manner.

Other objects and advantages of the present invention will be apparent from the following description, the accompanying drawings and the appended claims.

In the drawings:

FIG. 3 is a longitudinal sectional view of the tank shown in FIG. 2;

FIG. 4 is an enlarged sectional view of one end of the tank shown in FIG. 3;

FIG. 5 is another enlarged sectional view of the opposite end of the tank shown in FIG. 3;

FIG. 8 is a vertical sectional view of another embodiment of the invention;

FIG. 9 is an elevational view of a truck supporting a tank constructed in accordance with the invention;

FIG. 10 shows a semi-trailer supporting a somewhat larger tank; and

FIG. 11 shows a railroad car supporting an even larger tank constructed in accordance with the invention.

Figure 1:
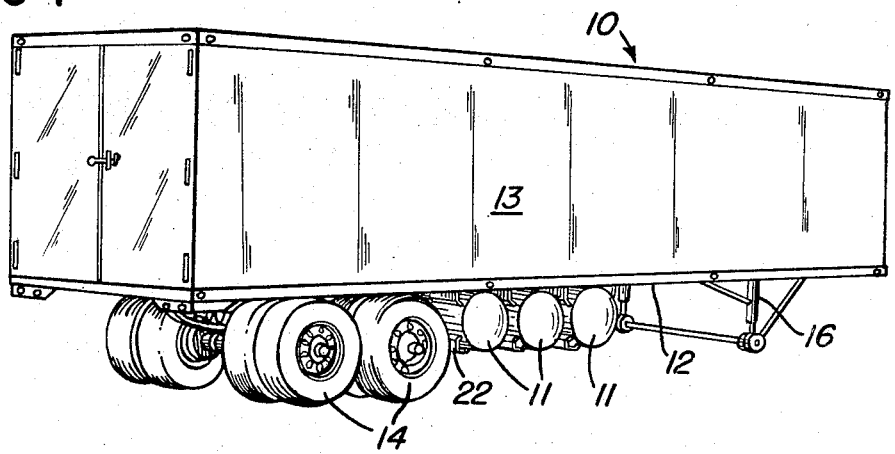
FIG. 1 is a perspective view illustrating a truck trailer having tanks constructed in accordance with the invention mounted thereon.
Figure 2:
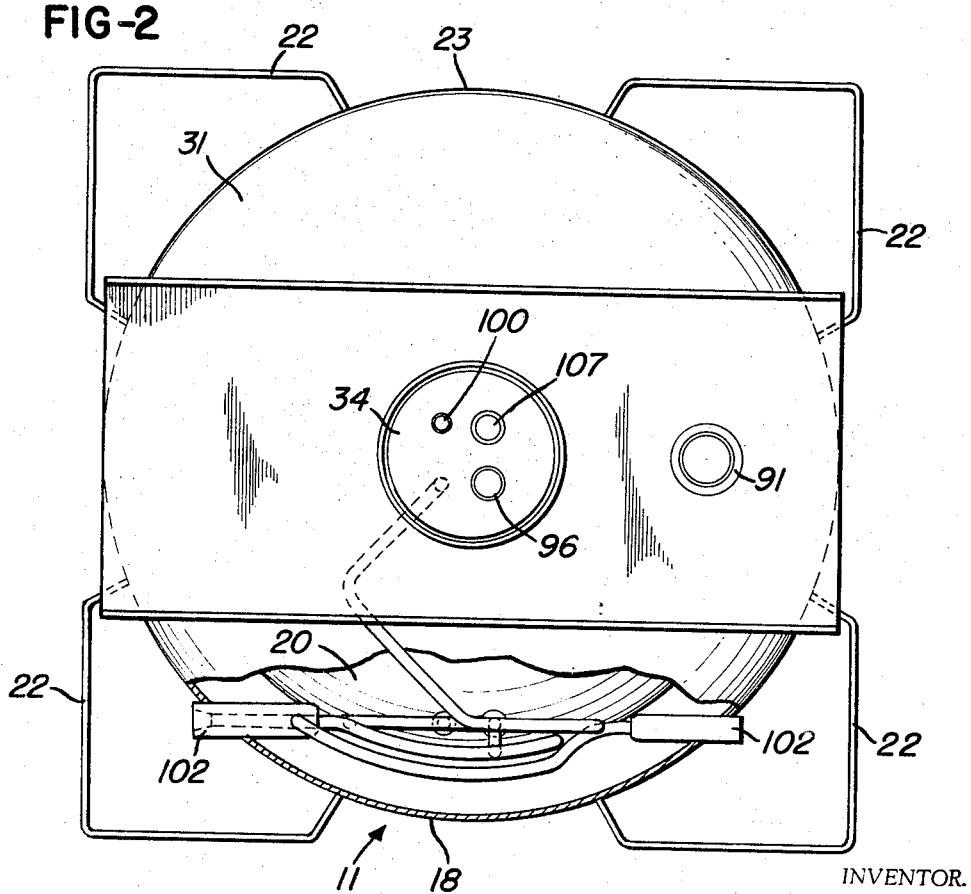
FIG. 2 is an end view of one of the tanks constructed in accordance with the invention.

Referring to the drawings which illustrate preferred embodiments of the invention, FIG. 1 shows a refrigerated trailer 10 of a conventional semi-truck trailer unit having a plurality of horizontal tank assemblies 11 mounted on the lower surface 12 of the trailer body 13 between the rear wheels 14 and the temporary support member 16. As shown in FIGS. 2 and 3, each of the tank assemblies 11 includes an elongated cylindrical outer tank 18 having an inner tank 20 of smaller but substantially similar configuration mounted therein.

The outer and inner tanks of each assembly are fabricated from sheet material such as sheet stainless steel and the inner tank defines an internal chamber for receiving cryogenic fluid. The outer tanks 18 each have four mounting brackets 22 rigidly secured to the outer surface 23 thereof and preferably extending the entire length of the tank for giving each of the tank assemblies a generally square outer configuration for ease in mounting on the lower surface 12 of the trailer 10, as well as for handling, storing and protection of the tank assemblies 11.

The inner tank 20 is supported within the outer tank 18 by an axially extending tubular support 24 which extends entirely through each of the tanks 18 and 20, and in effect, acts as a single relatively rigid backbone for interconnecting these tanks. The support 24 is preferably circular in cross-section to provide maximum strength and simplicity in fabrication. For purposes of description the support 24 is considered to have a central, right and left sections 25, 26, and 27, respectively, as viewed in FIG. 3.

The right-hand section 26 (FIG. 4) includes a hollow inner tube 28 which is welded between the mounting plate 30 disposed in the end wall 31 of the outer tank 18 and the intermediate support member or disk 33. The mounting plate 30 is rigidly secured in a complementary opening in the recessed end portion 34 of the end wall 31 which is adapted to receive a control unit for regulating the flow to and from, as well as the pressure within, the inner tank 20. The support disk 33 is held centrally within the inner tank 20 by the baffle 35 which has the radial flange 36 around the outer periphery thereof welded to the inner surface 38 of the tank 20.

The right section 26 of the support 24 also includes an outer cylindrical member or tube 40 which extends around and concentrically with the inner tube 28 between rigid and fluid tight connections with the annular mounting ring 42 in the end wall 43 of the inner tank 20 and the support disk 33 which is spaced substantially inwardly from the end wall 43. The reinforcing rings 44 surround and extend radially outwardly from the tube 40 for adding strength and rigidity thereto. As seen in FIG. 4, a space 45 is created between the inner and outer support tubes 28 and 40 for retarding the flow of heat between the inner and outer tanks, as will be explained in detail.

The left section 27 of the support 24 is similar to the right section 26 and includes inner and outer support members or tubes 46 and 48 which have the space 50 defined therebetween. The support tube 46 interconnects the end wall 52 of the outer tank 18 with the mounting member or disk 53, whereas the outer cylindrical member or support tube 48 interconnects the annular mounting ring 54 in the end wall 55 of the inner tank 20 and the mounting disk 53 spaced inwardly from the end wall 55. The mounting disk 53 is held securely centrally of the inner tank 20 by an annular baffle 57 which has the flange 58 on the outer periphery thereof welded to the inner surface 38 of the tank 20.

An expansion connection 62 is interposed between the inner tube 46 and the end wall 52 of the tank 18, as seen in FIG. 5. This connection includes an annular guide ring 63 which is rigidly mounted on the inside surface 64 of the end wall 52 of the outer tank 18 and extends inwardly thereof coaxially with the inner tube 46. An annular support bracket 65 is utilized to add rigidity to the guide ring 63 since it supports one-half the weight of the inner tank 20 and its contents. The male guide member 66 is secured rigidly in the left-hand end of the inner tube 46 and is received within the female guide ring 63 for reciprocal movement therein so that the members 63 and 66 cooperate to permit axial expansion of the inner tank 20. As shown in FIG. 5, a spring 67 is interposed between the end wall 52 and the interior shoulder 68 of the male guide member 66 for urging this member to the left to reduce vibration caused by looseness between the guide ring and female member. A mounting screw 70 (FIG. 3) is utilized only during assembly of the tanks 18 and 20 to lock the members 63 and 66 together and, when in use, extends through the aperture 71 in the end wall 52 of the outer tank and into threaded engagement with the bore 72 in the guide member 66.

The central section 25 of the support 24 includes a pair of tubular members 74 and 75 which interconnect the support members or disks 33 and 53, respectively, with the centrally disposed support member or disk 77 supported centrally in the inner tank 20 by the brace rods 78 and the radial tubes 80 and 81 (FIG. 7), which are connected to the radial flange 82 secured on the inner surface 38 of the tank 20. As shown in FIG. 4, the support disk 33 has four shoulders thereon for facilitating the rigid connection of the inner and outer tubes 28 and 40, the baffle 35, and the tube 74 of the central section 25, and the support disk 53 has substantially identical shoulders thereon for a like purpose.

The tubular support 24 thus extends entirely through both the inner and outer tanks 18 and 20 and forms a rigid high straight support for the inner tank 20 within the outer tank 18 without additional auxiliary supports or braces therebetween. The baffles 35 and 57, the braces 78, and the tubes 82 rigidly interconnect the inner tank 20 to the support 24 so that there is little tendency of the inner tank 18 to flex along its longitudinal axis when subjected to dynamic loads as might occur as a truck hits a rough spot in the roadway. In addition, a simple but highly effective structure is provided for permitting longitudinal expansion and contraction of the inner tank 20 with respect to the outer tank 18 without subjecting either tank to substantial stressing.

The space 90 between the inner and outer tanks 18 and 20 is evacuated through the opening 91 (FIG. 2) so that the spaces 45 and 50 between the inner and outer tubes of the support sections 26 and 27 are also evacuated and the flow or transfer of heat due to conduction and convection between these tanks 18 and 20 is greatly reduced. A heat flow reduction is also achieved by wrapping the outer surface of the inner tank 20 with insulation, preferably consisting of glass fiber material covered with a highly polished metal foil to reduce radiant heat transfer. Another important feature of the invention is the smooth and unobstructed outer surface of the inner tank 20 making it possible to wrap the insulation quickly and easily thereon by machine in an optimum pattern.

The piping system for filling, pressurizing, and emptying the tank assembly 11 per se forms no part of this invention but is described to illustrate several features of the invention. Thus the piping system includes a fill-drain line with a vertical section 93 secured to the disk 77 with its outlet 94 (FIG. 7) positioned near the bottom of the inner tank 20. The horizontal section 94 of this line connects with the vertical section 93 through passage 95 in the disk 77 and extends centrally the tube sections 25 and 26, the disk 33, and plate 30, and has a trap 96 therein for preventing the flow of gaseous fluids when the system is not being filled or drained.

The pressurizing line 97 extends along the lower inner surface of the inner tank from its inlet 98 and then outwardly of the tank 20 through an evaporation coil section 99 and into the mounting plate 30. The control box, not shown, regulates the flow through the line 97, and connects it to a return line 100 which passes through the sections 25 and 26 and into the disk 77 having a passage 101 therein which connects to the tube 80. The evaporation coil may be provided with exterior connections 102 for communication with adjacent tanks or auxiliary pressurization apparatus. An outlet pipe 103 is connected to the support pipe 80 and extends upwardly to the highest point in the tank 20 so that even when the tank is almost full, the pressurizing gas will be admitted into the tank 18 above the liquid.

The short pipe section 104 communicates with the other pipe 81 which is connected to a passage 105 in the disk 77 having the outlet pipe section 107 connected thereto and extending outwardly of the tank assembly 10 through the sections 25 and 26. The pipe section 104 is used for indicating when the liquid level therein is at a desired level, and these pipe sections 104 and 107 are connected to a conventional tri-cock valve.

Figure 6:
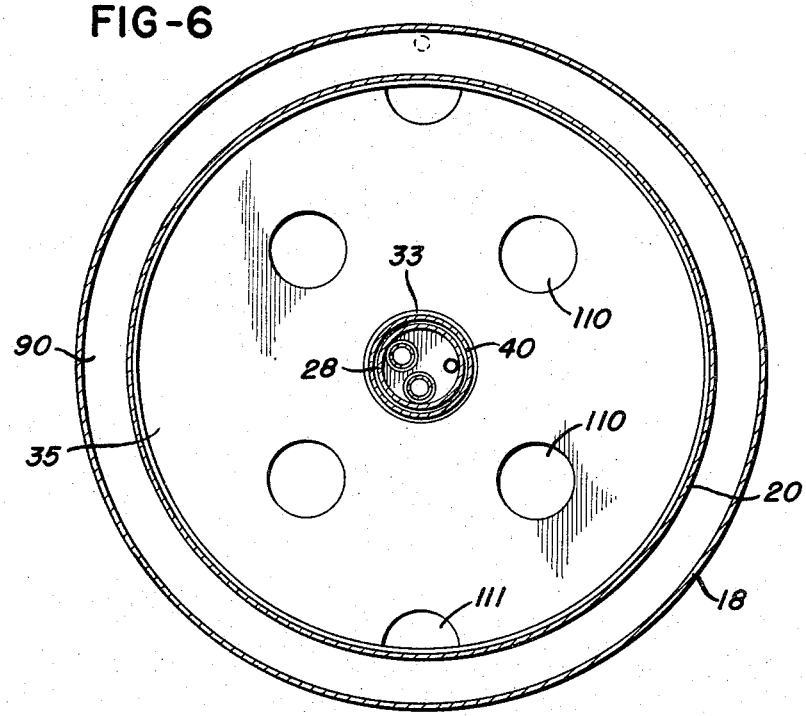
FIG. 6 is a sectional view taken essentially along the line 6—6 of FIG. 3.
Figure 7:
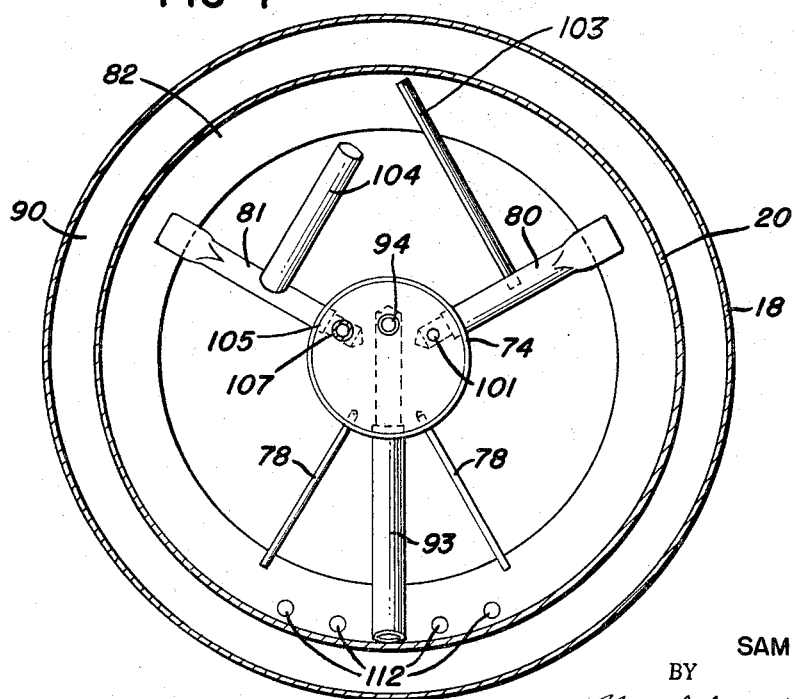
FIG. 7 is a sectional view taken along the line 7—7 of FIG. 3.

As shown in FIGS. 6 and 7, the support baffles 35 and 57 are provided with a plurality of openings 110 therein for flow of fluids between the various portions of the inner tank 20, and the openings 111 and 112 in the baffles and radial flange 82, respectively, are provided adjacent the bottom of the tank so that the tank 20 can be substantially completely emptied. On the other hand, the baffles 35 and 57 substantially reduce the movement of liquids in the tank 20 which would otherwise be present when the tanks are mounted on a vehicle.

The heat transfer or flow by conduction through the support structure between the tanks 18 and 20 is substantially reduced by the structure used to secure the inner tank within the outer tank. The flow of heat W by conduction is equal to $$W = \frac{A}{L} \int_{T_1}^{T_2} K\, dt$$

where

A is the cross-sectional area of the path of transfer,
L is the distance through which the heat flows,
$T_1$ and $T_2$ are the temperatures at each end of the distance L, and
K is the thermal conductivity of the material.

In the structure of the invention, the distance L is substantial since it represents the distance between the end walls of the outer tank 18 and the support disk in the inner tank 20, which is essentially the length of the support tubes 28 and 46. On the other hand, the total area A of the heat transfer path is minimized by use of the support tubes 28 and 46 which provide a minimum cross-sectional area for their substantially high support strength. Furthermore, since the air in the spaces 45, 50, and 90 is evacuated, the heat loss by convection and conduction through the air is substantially eliminated, and by using the polished insulating material between the tanks 18 and 20 heat loss by radiation can also be greatly reduced.

Another embodiment of the invention is shown in FIG. 8, wherein the stationary vertical tank structure 115 includes an outer tank 116 which has an inner tank 118 mounted therein, and these tanks are separated by a space 120 which is evacuated to eliminate heat flow between the tanks 116 and 118 by convection and conduction. The outer tank 116 is supported by three downwardly extending legs 121 which are welded to the bottom wall 122 of the tank 116 and have the pressure plate 124 on the bottom thereof. An annular reinforcing ring 125 is welded centrally on the bottom wall 122 of the tank 116, and the reinforcing ribs 127 are similarly welded to the bottom wall 122 and extend between the ring 125 and each of the legs 121 for adding strength to the bottom wall which carries the entire weight of the inner tank 118 and its contents.

A tubular support 130 extends axially upwardly from the support plate 131 on the inside surface 132 of the bottom wall 122 opposite the reinforcing ring 125 for supporting the inner tank 118. To accommodate the support 130, the inner tank is provided with an elongated tubular member or tube 134 which extends from the end or bottom wall 140 inwardly into the fluid receiving chamber defined by the inner tank. The tube 134 has a larger inner diameter than the outer diameter of the coextensive portion of the support 130 so that a space 141 is defined therebetween when the tanks 116 and 118 are properly mounted together.

A mounting member or disk 137 having a shoulder 138 is rigidly secured to the top of the support 130, and the upper end of the tube 134 is similarly rigidly secured adjacent the radial flange 138 on the disk 137 so that the outer tube 134 and the inner tank 118 are mounted on the support 130. The bottom wall 140 of the inner tank 118 has an aperture therein for receiving the lower end portion of the tube 134 which is welded to the tank. An annular reinforcing ring 142 is secured to the lower end of the tube 134, as well as to the bottom wall 140 for strengthening purposes. The upper end of the inner tank 118 is stabilized by the relatively thin connector rods 144 which are welded to the plate 145 on the top wall 146 of the inner tank 118 to the inner radial flange 147 on the outer tank 116.

Thus the vertical embodiment of the tank assembly 115 includes many of the features of the embodiment shown in FIGS. 1-7. In particular, the inner tank 118 has an outer surface which is unrestricted so that insulation can be easily applied thereto by machine in an optimum pattern for reducing heat loss by radiation. The heat loss due to the support structure between the inner and outer tanks 116 and 118 is held to a minimum and a very sturdy tank structure is provided which has a comparatively long heat flow path through the support for reducing the inward flow of heat due to conduction. The air in the space 120 between the tanks 116 and 118 is evacuated so that heat flow by convection and conduction between the tanks and between the support 130 and tube 134 is held to an absolute minimum.

While the tank assembly 11 has been shown and described as a relatively small tank adapted for mounting on the underneath side of a truck and the tank assembly 115 (FIG. 8) illustrates a vertical embodiment, it is also within the scope of the invention to construct a larger tank assembly and mount it on a vehicle. Thus referring to FIG. 9, a tank assembly 150 constructed substantially the same as the tank assembly shown in FIG. 3, is mounted on the bed 151 of a truck 152. To reinforce the outer tank 154 for supporting the inner tank 155, the bed 151 supports rigid frame members 157 and 158 which project upwardly and are connected to the corresponding support tubes 159 and 160. A housing 161 covers the rear frame member 158. Thus the inner tank 155 is rigidly supported with maximum resistance to dynamic loading.

FIG. 10 shows another modified form of a tank vehicle and includes a tractor 162 having a fifth wheel 163. A frame member 165 is rotatably supported by the fifth wheel and supports the forward end portion of an elongated outer tank 166. The frame member 165 includes an upwardly projecting portion 167 which is connected to the tubular support 169 for reinforcing the forward end portion of the outer tank 166 to aid in providing a rigid support for the inner tank 171. A truck member 175 supports the rear end portion of the outer tank 166 and includes an upwardly extending frame member 176 which is rigidly connected to the tubular support 178 projecting from the rear end portion of the inner tank 171. A housing 179 covers the rear end portion of the outer tank 166 and frame member 176 and cooperates with the tank assembly, truck 175 and frame member 165 to form a semi-trailer.

Another form of the tank assembly is shown in FIG. 11 and includes a pair of railroad trucks 180 supporting the end portions of the outer tank 182. Each truck 180 includes an upwardly projecting frame member 184 which is rigidly connected to the corresponding tubular support 185 in the same manner as described above for the embodiments shown in FIGS. 9 and 10 to reinforce the outer tank 182 for providing a high strength support for the inner tank 186.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:
1. An insulated tank for storing cryogenic fluids comprising, an outer tank, an inner tank mounted within said outer tank and having a configuration similar to but smaller than the outer configuration of said outer tank for defining a space between said tanks, said inner tank having a tubular recess in opposite portions thereof, each of said recesses having a support plate at the innermost end thereof, a tubular support secured to said outer tank opposite each of said recesses and extending into said recesses to a connection with one of said support plates, said tubular supports each having an outer diameter smaller than the inner diameter of said tubular recesses to form a heat flow retarding space therebetween, and an internal axial support interconnecting said support plates within the interior of said inner tank for cooperation with said tubular support members to form a rigid backbone disposed centrally of said tanks to support said inner tank within said outer tank for maximum resistance to dynamic loading.

2. An insulated tank for storing cryogenic fluids comprising, an outer tank, an inner tank mounted within said outer tank and having a configuration similar to but smaller than the outer configuration of said outer tank for defining a space between said tanks, said inner tank having a tubular recess in opposite portions thereof, each of said recesses having a support plate closing the innermost end thereof, perforated baffle means for supporting said support plates against radial movement in said inner tank, a tubular support secured to said outer tank opposite each of said recesses and extending into said recesses to a connection with one of said support plates, said tubular supports each having an outer diameter smaller than the inner diameter of said tubular recesses to form a heat flow retarding space therebetween, an internal axial support interconnecting said support plates within the interior of said inner tank for cooperation with said tubular support members to form a rigid backbone disposed centrally of said tanks to support said inner tank within said outer tank for maximum resistance to dynamic loading.

3. An insulated tank for storing cryogenic fluids comprising, an elongated cylindrical tank having end walls at opposite ends thereof, an inner tank mounted within said outer tank and having a configuration similar to but smaller than said outer tank for defining a space between said tanks, means defining tubular recesses in the ends of said inner tank extending a substantial distance into said inner tank, each of said recesses having a support plate at the innermost end thereof, a tubular support secured to said outer tank opposite each of said recesses and extending into said recesses to a connection with one of said support plates to create relatively long heat flow paths between said tanks, said tubular supports each having an outer diameter less than the inner diameter of said tubular recesses to form a heat flow retarding space therebetween, and a central support tube interconnecting said support plates and said tubular supports within the interior of said inner tank for cooperation with said tubular supports to form a rigid backbone disposed centrally of said tanks to support said inner tank within said outer tank against structural failure caused by dynamic loading.

4. An insulated tank as defined in claim 3 wherein baffle means are mounted internally of the inner tank and are rigidly interconnected to said tubular supports for reducing relative radial movement between said inner tank and said tubular supports to add rigidity to the tank.

5. An insulated tank as defined in claim 3 wherein expansion means are provided in at least one of said tubular supports for absorbing dimensional changes in said inner tank and said central support tube caused by temperature variations without imparting any substantial stress to the outer tank.

6. An insulated tank as defined in claim 3 wherein disk-shaped baffle means are provided to interconnect the side walls of said inner tank with said support plates.

7. An insulated tank as defined in claim 6 wherein brace means are provided to interconnect the side walls of said inner tank with said central support member intermediate said baffle means.

8. An insulated tank as defined in claim 3 wherein said tubular supports are adapted to receive the piping used to control the flow of fluids into said inner tank so that the outer side wall of said inner tank is substantially smooth and free of obstructions.

9. An insulated tank for storing cryogenic fluids comprising an outer tank, an inner tank disposed within said outer tank and cooperating therewith to define a space between said tanks, said inner tank having wall means defining a chamber for receiving a fluid, at least one elongated tubular member extending upwardly into said chamber from the bottom of said wall means, a tubular support secured to the bottom of said outer tank and extending upwardly into said tubular member coextensive therewith, reinforcing means secured to the outer surface of the bottom of said outer tank beneath and supporting the lower end of said tubular support, means spaced upwardly from the bottom of said wall means of said inner tank for connecting said tubular support to said tubular member and forming the sole rigid connection between said tubular support and said tubular member, said tubular support disposed to support the weight of said inner tank along with the fluid therein, said tubular support being smaller in cross-section than said tubular member to form a heat flow retarding space therebetween and to provide a high strength support for said inner tank within said outer tank while minimizing heat transfer therebetween and stabilizing means connecting the upper end portion of said inner tank to the upper end portion of said outer tank stabilizing said inner tank laterally only relative to said outer tank.

10. An insulated tank for storing cryogenic fluids comprising an outer tank, an inner tank disposed within said outer tank and having a configuration similar to but smaller than said outer tank to define a space between said tanks, said inner tank having outer wall means defining a chamber for receiving a fluid, tubular backbone means of circular cross-section extending centrally through said inner tank and connecting opposite portions of said wall means, a tubular support of circular cross-section extending into each end portion of said tubular backbone means and each said tubular support secured to said outer tank, means spaced inwardly from each said portion of said inner tank for rigidly connecting each said tubular support to said tubular backbone means, and each said tubular support having an outer diameter smaller than the inner diameter of the coextensive portion of said tubular backbone means to form a heat flow retarding space therebetween and to provide a high strength support for said inner tank within said outer tank while minimizing heat transfer therebetween.

11. An insulated tank for storing cryogenic fluids comprising, an outer elongated tank, an inner tank disposed within said outer tank and having a configuration similar to but smaller than the configuration of said outer tank for defining a space between said tanks, said inner tank having outer wall means defining a chamber for receiving a fluid, tubular members extending into said chamber from opposite end portions of said wall means, a tubular support extending into each said tubular member and each said tubular support secured to said outer tank, means spaced inwardly from said end portions of said wall means for rigidly connecting each said tubular support to the corresponding said tubular member, each said tubular support being smaller in cross-section than the coextensive portion of the corresponding said tubular member to form a heat flow retarding space therebetween, and means rigidly interconnecting said tubular members within said chamber to form a rigid backbone which cooperates with said tubular supports to form a high strength and rigid support for said inner tank within said outer tank while minimizing heat transfer therebetween.

12. A tank as defined in claim 11 including a plurality of longitudinally extending brackets secured to said outer tank and spaced at predetermined intervals on the periphery thereof for providing convenient mounting and protection of said tank.

13. A tank as defined in claim 12 wherein said outer tank has a cylindrical configuration, four of said brackets mounted on said outer tank and each having a generally right angular cross-sectional configuration and uniform wall thickness, and said brackets arranged uniformly on said outer tank to form a tank support having a generally square outer configuration.

14. A tank as defined in claim 11 in combination with a vehicle having means for supporting said inner and outer tanks with the axis of said tubular supports extending horizontally.

15. A tank vehicle combination as defined in claim 14 wherein said vehicle includes a truck having a bed supporting said outer tank, and rigid frame means extending upwardly from said bed and connected to said tubular supports to reinforce said outer tank for supporting said inner tank and the fluid contained therein.

16. A tank vehicle combination as defined in claim 14 wherein said vehicle includes a tractor having a fifth wheel, a semi-trailer including a frame mounted for rotation on said fifth wheel and supporting one end portion of said outer tank, said frame including an upwardly extending portion connected to the corresponding said tubular support, a truck member supporting the opposite end portion of said outer tank and including an upwardly extending frame connected to the corresponding tubular support for reinforcing said outer tank to support said inner tank and the fluid contained therein.

17. A tank vehicle combination as defined in claim 14 wherein said vehicle includes a pair of spaced railroad trucks each supporting one end portion of said outer tank and each including an upwardly extending portion connected to the corresponding said tubular support to reinforce said outer tank for supporting said inner tank and the fluid contained therein.

No references cited.

THERON E. CONDON, *Primary Examiner.*

J. R. GARRETT, *Assistant Examiner.*